United States Patent [19]

Shyu

[11] Patent Number: 4,716,427
[45] Date of Patent: Dec. 29, 1987

[54] CAMERA MEANS FOR REGULATING THE EXPOSURE AREA OF A FRAME OF FILM

[76] Inventor: Shiow-Feng Shyu, P.O. Box 10780, Taipei, Taiwan

[21] Appl. No.: 840,492

[22] Filed: Mar. 17, 1986

[51] Int. Cl.⁴ .................. G03B 1/00; G03B 13/02; G03B 17/38
[52] U.S. Cl. .................. 354/159; 354/213; 354/222; 354/266
[58] Field of Search .............. 354/159, 222, 212, 213, 354/266; 352/79

[56] References Cited

U.S. PATENT DOCUMENTS

| | | | |
|---|---|---|---|
| 2,233,239 | 2/1941 | Baumgartner | 354/159 |
| 2,247,104 | 6/1941 | Takacs | 354/159 |
| 2,295,801 | 9/1942 | Nagel | 354/159 |
| 2,522,387 | 9/1950 | Linens | 354/159 |
| 2,621,561 | 12/1952 | Andersson | 354/159 X |

*Primary Examiner*—Michael L. Gellner

[57] ABSTRACT

A camera having means for regulating the exposure area of a frame of film has one operating member extending to the outside of the camera body and arranged to operate a regulating plate inside the camera body to move said plate between two positions. In a first position, as shown in the drawing, a full frame of film is exposed and a whole picture can be viewed through the viewfinder, and in the second position, the side areas of the viewfinder are shielded by the plate and a pair of opaque movable blades are moved to shield the exposure window from the sides so that only half of the film frame is exposed. At the same time as the regulating plate is moved from the first to the second position, a clutch device for controlling the film advance wheel is actuated, so that the wheel will rotate only one half cycle for each photograph to reduce the length of the wound film to one half of the length that is wound for whole frame photography.

13 Claims, 20 Drawing Figures

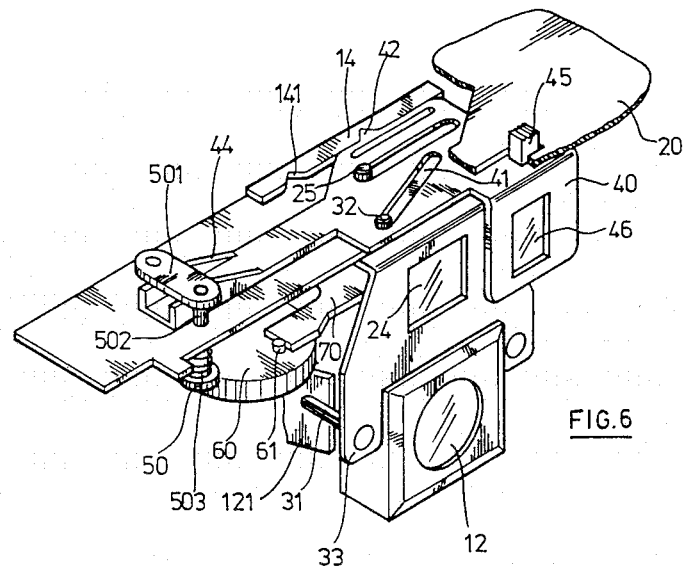
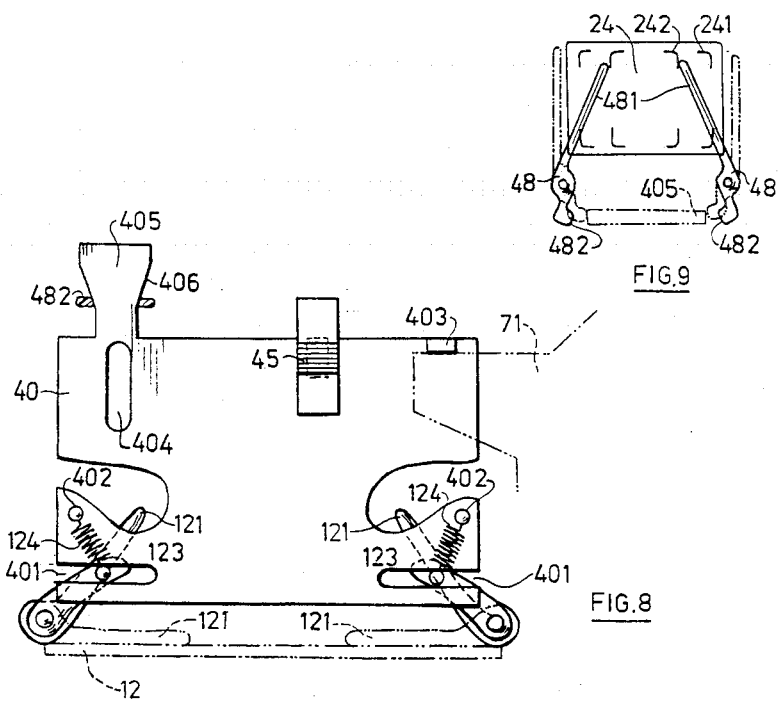

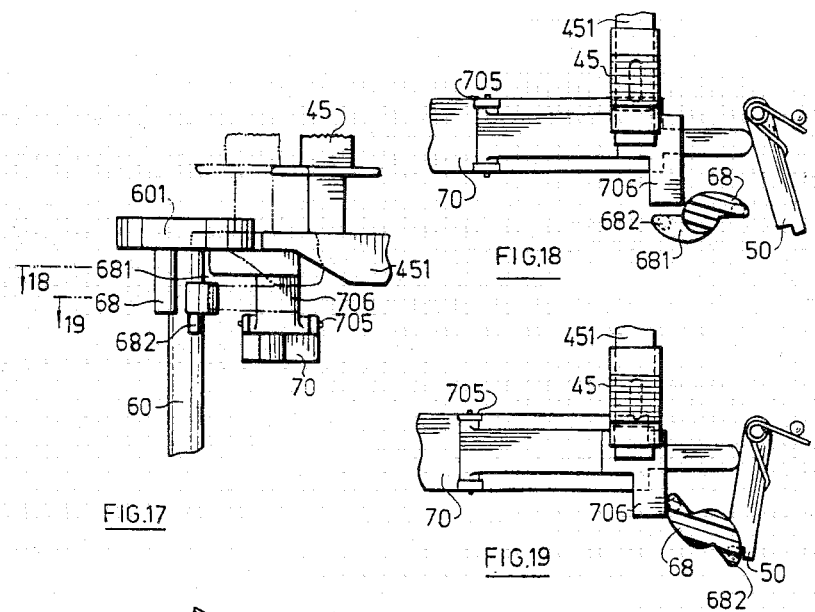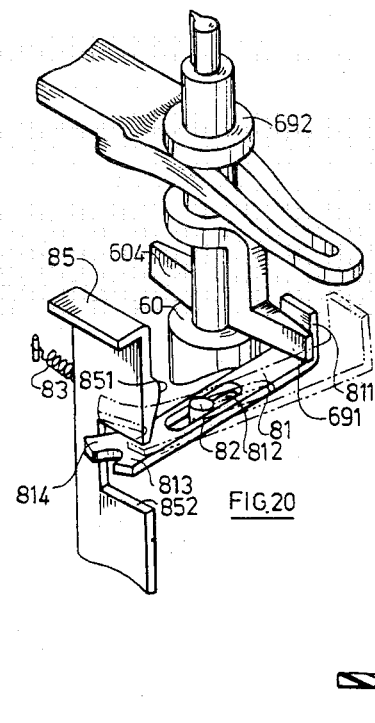

CAMERA MEANS FOR REGULATING THE EXPOSURE AREA OF A FRAME OF FILM

BACKGROUND OF THE INVENTION

Nowadays, cameras can be divided into two types according to how the films are used. One type is called as "whole frame" camera, and the other type as "half frame" camera. If we load a 36 exposure roll of film in a camera and we can only take 36 pictures, it is a "whole frame" camera, but if we load a 36 exposure roll of film and we can take 72 pictures, it is a "half frame" camera. The reason is that when the shutter release button of a whole frame camera is pressed, a whole frame of film will be exposed to light while in a "half frame" camera, only "one half" of a frame will be exposed to light. Therefore a "half frame" camera can take twice as many pictures as a "whole frame" camera. Of course, a "whole frame" camera can take wider and clearer pictures because its exposure area is a "whole frame". However, when an object to be photographed is too small or far away, areas around the frame would be unnecessary so as to waste some of the film. Under this situation, the most ideal and economic way is to take pictures with a "half frame" camera. Moreover, when we are taking pictures, we often find that, when the roll of film is nearly used up, there are still several valuable pictures not yet taken, but there is insufficient film left. Under such situation it would be convenient if we could change a "whole frame" camera to a "half frame" camera in order to take the desired pictures. It has previously been proposed to provide devices for adjusting the exposure area or to adjust photographing but such devices have tended to be complicated and inefficient.

One such device proposed in U.S. Pat. No. 2,247,104 adjusts the exposure area of a film by using a roll and a string to pull a screen to move toward the film horizontally so that the area of exposure can be appropriately shielded. This device is very complicated, cannot ensure the film length which has been wound, and can not be easily operated.

Another device has been proposed in U.S. Pat. No. 2,295,801 which uses a slide to adjust a mask plate to shield the dimensions of the viewfinder and adjust the winding length of the film simultaneously by means of a gear set. Another separate operation makes the opening rotate 90 degrees to change the exposure area.

A further device has been proposed in U.S. Pat. No. 2,522,387, in which the body of the camera can be moved from two end sides toward the centre to change the width of the camera body such that the exposure area and the viewfinder dimensions are adjusted.

All the devices described above possess a complicated structure and cannot be manufactured easily. Therefore, my former U.S. pending patent is identified with Ser. No. 706,291 providing a device which can change dimensions quickly and be operated easily.

BRIEF SUMMARY OF THE INVENTION

The object of the present invention is to provide a two-size camera which utilizes a slide to move one special device to actuate the view shield device to shield portion of view area from two sides of the viewfinder such that the effective view width of the viewfinder is reduced to one half of the original size, to move two opaque blades to shield the sides of the exposure window such that the exposure width is reduced to one half of the original size, and, at the same time, to reduce the film length wound by the film advance wheel to one half of the normal length.

BRIEF DESCRIPTION OF THE DRAWINGS

The invention will now be further described, by way of example, with reference to the drawings, in which:

FIG. 6 is a perspective view to show the corresponding positions of the main components of this invention;

FIG. 8 is a top partial view of the second example to illustrate the operating relationship between the regulating plate and the opaque movable blades;

FIG. 9 is a front partial view of the second example to illustrate the view shielding device for shielding the viewfinder;

FIG. 14 is a further front sectional view corresponding to FIG. 13 but showing additional components;

FIG. 17 is a side view of a fifth example to show how the regulating plate controls the film advance wheel;

FIG. 18 is a partial view taken along the line 18—18 of FIG. 17;

FIG. 19 is a partial view taken along the line 19—19 of FIG. 17; and

FIG. 20 is a perspective view of a sixth example.

DETAILED DESCRIPTION OF THE PREFERRED EMBODIMENTS

Figure 1:
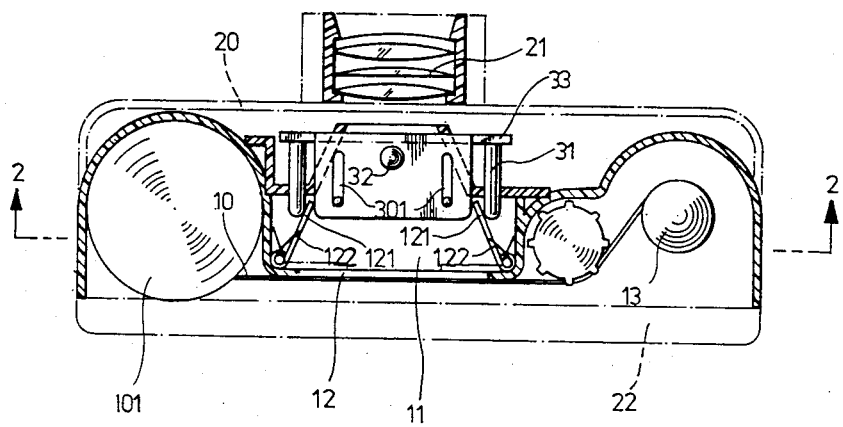
FIG. 1 is a top sectional view of one example of a camera according to the invention taken along the line 1—1 of FIG. 2 to show the changing device for the exposure window width.

According to the invention, a camera which can regulate the exposure area of a frame of film comprises a body; a film advance wheel for turning the film take-up spool around and for returning a shutter striking plate to its original position; a regulating plate; a view shield device arranged to be actuated by the regulating plate and movable between a first position in which it is substantially clear of the viewfinder and a second position in which it is effective to shield the viewfinder to reduce the viewing area to approximately half the total width thereof; means for guiding movement of the regulating plate; at least two opaque movable blades arranged to be driven by the regulating plate to shield an exposure window of the camera from the sides of the window such that the width of the exposure window is reduced to approximately one half of the total width; a clutch device actuable by the regulating plate to control the film advance wheel to rotate through one cycle or one half cycle on each operation of the shutter mechanism of the camera; and an operating member accessible from outside the camera, said operating member being arranged to move the regulating member between two positions: when said regulating member is moved from a first to a second position, the view shield device is moved to the second position, and the opaque movable blades are moved to shield half of the width of the exposure window and also the control means for the film advance wheel is operated so that said wheel can rotate through only one half cycle after each shutter operation such that the length of the film advance is reduced to one half of the normal length advanced; and when said regulating member is moved from the second position back to the first position, the view shield device is moved to the first position, and the opaque movable blades are moved to a position in which they no longer obstruct the exposure window and will move said control means for the film advacnce wheel so that said wheel can rotate through one full cycle after each shutter operation, so that the length of film advanced corresponds to a full frame of the exposure window.

According to one embodiment of the invention, the view shield device comprises a viewfinder eyepiece cover (the width of the view shield device is one half of the width of the viewfinder) movable with the regulating plate to overlap the viewfinder when the said regulating plate is moved to its second position.

In another embodiment of the invention, the view shield device comprises a pair of indicating pointers which are actuable by the regulating plate and can be moved from the sides of the viewfinder to cover the side areas of the viewfinder, when the regulating plate is moved to its second position.

As a further alternative, the view shield device may comprise an indicating device which is actuable by the regulating plate and is pivotally movable to cover the side areas of the viewfinder, when the regulating plate is moved to its second position.

The clutch device may comprise at least one inclined plate which is on the regulating plate and is engageable with means for regulating the elevation of a locating hook, and therefore the film advance wheel may be provided with two projections of different height: the locating hook being effective to block only one of the projections in the first position of the regulating plate to permit one complete revolution of the film advance wheel, or the said locating hook to block both of the projections in the second position of the regulating plate to permit only half a revolution of said film advance wheel.

Alternatively, the clutch device may comprise two overlapping clutch plates mounted on a shutter striking plate and the film advance wheel may be provided with two projections of different height: said clutch plates being movable by the regulating plate to one position so that only one of the projections is blocked by the clutch plates so as to permit one complete revolution of the film advance wheel, and in the other position both of the projections are blocked by the clutch plates so as to permit only half a revolution of the said film advance wheel.

Preferably, the projections on the film advance wheel comprise pins of different height spaced apart by 180 degrees from each other and located at substantially the same radial distance from the axis of the wheel.

According to another embodiment of the invention, the clutch device comprises an auxiliary drive wheel which is engageable with the film advance wheel and which is coaxially arranged with respect thereto, the regulating plate having an inclined face which is engageable with the auxiliary drive wheel to raise or lower said wheel and the auxiliary drive wheel having a projection which in the lower position of said wheel is engageable with blocking means to restrict rotation of the film advance wheel. The projection on the auxiliary drive wheel may comprise an auxiliary drive rod which extends through a bore in the film advance wheel provided with a main drive rod spaced from the auxiliary drive rod by 180 degrees, the rods being located at substantially the same radial distance from the axis of said film advance wheel. Alternatively, the projection on the auxiliary drive wheel may comprise a drive cam.

According to a further embodiment of the invention, the clutch device comprises a cam having two cam lobes mounted on the film advance wheel, one cam lobe being engageable with a projection in both positions of the regulating plate and the other cam lobe being engageable with a projection on only the second position of the regulating plate. The regulating plate may be provided with an inclined face which is engageable with a lever and which is effective, when the regulating lever is moved to its second position, to move said lever into a position in which it is engageable with both of said cam lobes.

According to yet another embodiment of the invention, the clutch device comprises a brake plate engageable with a drive cam mounted on the film advance wheel, one end of said brake plate being engageable by the drive cam and the other end being engageable in an opening in a press plate, the brake plate being movable, in response to movement of the regulating plate, between a first position in which it permits one complete revolution of the film advance wheel for full frame photography and a second position in which it permits only one half revolution of the film advance wheel for half frame photography.

Figure 2:
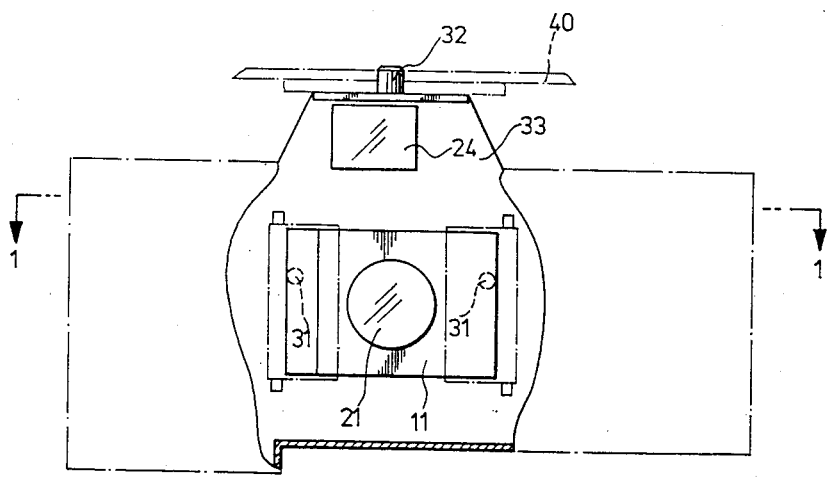
FIG. 2 is a front partial sectional view of the camera shown in FIG. 1 taken along line 2—2 of FIG. 1.
Figure 5:
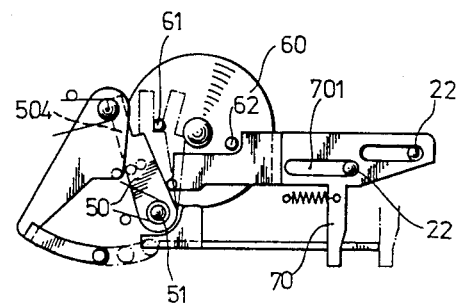
FIG. 5 is a top view taken along the line 5—5 of FIG. 3 to show the length control of wound film.

Referring to the drawings, the camera has a chamber for accommodating a film cartridge 101 from which a film 10 can be pulled to pass an exposure window 12 of an exposure chamber 11 and be wound up by a film advance wheel 13. Between the exposure window 12 and the lens 21 of the camera, there are two opaque pivotally movable blades 121 which are acted upon by respective springs 122 and open toward the lens 21. The front ends of movable blades 121 are engaged by respective push rods 31 which, when moved towards the back cover 22 of the camera, will push the opaque movable blades 121 to cover the two sides of the exposure window 12 (as indicated by the chain-dotted lines in FIGS. 1 and 2), so that the exposure width of the frame of the film 10 will become one half of the original exposure width. The push rods 31 are fixed on a plate 33 whose upper end extends perpendicularly to be fixed by a rod 32. The rod 32 is located in an elongate slot 41 of a regulating plate 40. This regulating plate 40 can be moved towards the left or the right and its rear edge has a positioning projection 42 engageable with either of two matching notches 141 provided in a positioning plate 14, whereby the engagement of the projection 42 in the notches 141 is effective to fix the regulating plate 40 at either of two positions.

Figure 4:
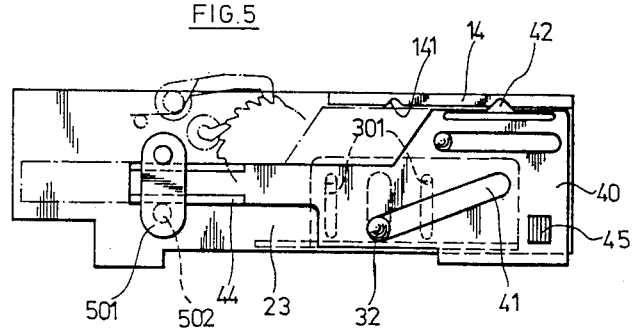
FIG. 4 is a top view taken along the line 4—4 of FIG. 3.
Figure 3:
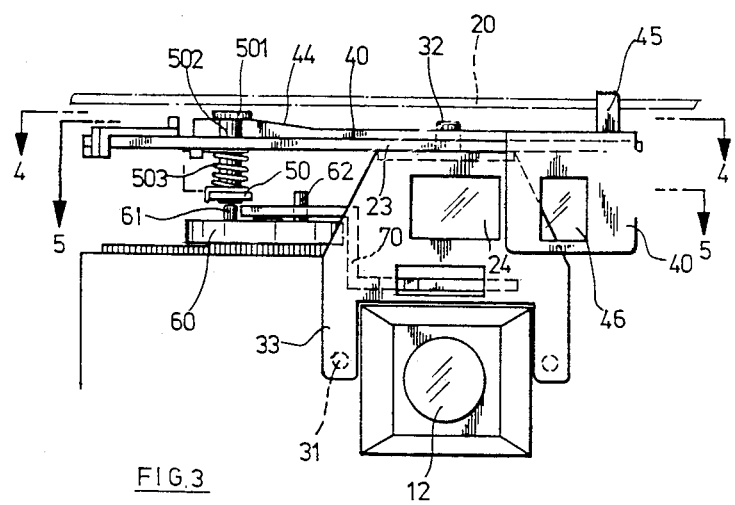
FIG. 3 is a rear view of the camera shown in FIGS. 1 and 2 to show the position of the regulating plate.
Figure 7:
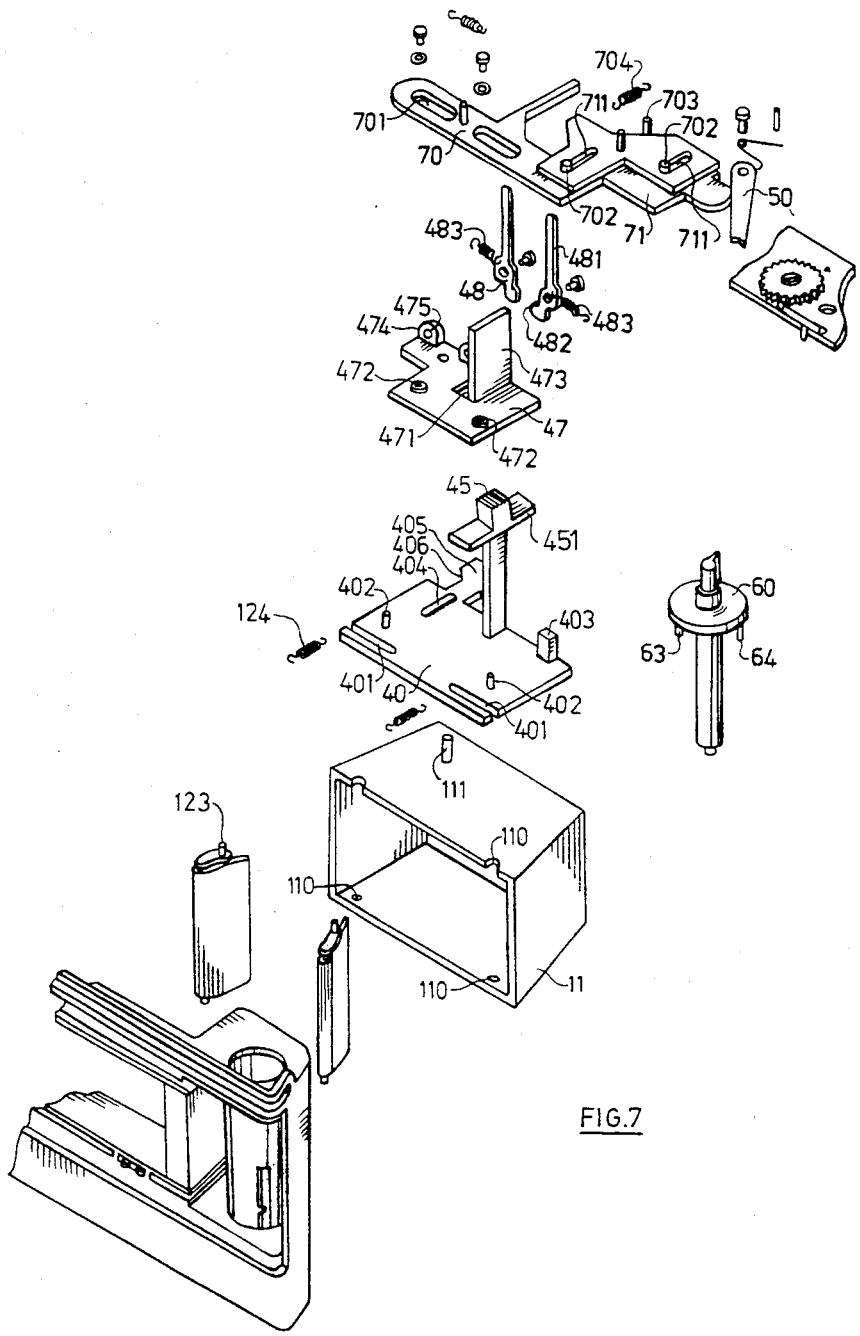
FIG. 7 is a perspective view of disassembled components of a camera according to a second example of the invention.

As shown in FIGS. 3, 4 and 6, an operating member 45 is mounted on the regulating plate 40 and extends to the outside of the camera body 20, such that the regulating plate 40 can be moved and positioned by the operating member 45 from outside the camera body. A pair of inclined ends 44 at the left side of the regulating plate 40 are mounted under a reciprocating plate 501 to raise or lower said plate 501. Each end of the reciprocating plate 501 carries a rod 502 which passes through a plate 23 and then is mounted in a coil spring 503 to urge the plate 501 against the plates 44. A locating hook 50 is mounted at the lower end of one of the rods 502 so that the locating hook 50 can move with the reciprocating plate 501.

The free end 504 of the locating hook 50 has an opening for blocking a lower positioning pin 61 or an upper positioning pin 62. These two positioning pins, 61 and 62, spaced apart by 180 degrees with the same radius, are fixed on a film advance wheel 60 and are able to move a striking plate 70 to a position to get ready for striking. The striking plate 70 has a pair of elongate slots 701 in which respective guide pins 22 are located to make the striking plate 70 move regularly within a certain path.

As shown in FIG. 3, when the regulating plate 40 is pushed by the operating member 45 to the right side, the whole device is set for whole frame use. The active viewfinder eyepiece cover 46 is moved away from the viewfinder 24 so that the viewfinder 24 can be used for whole frame photography. The inclined ends 44 of the regulating plate 40 push the reciprocating plate 501 to cause the locating hook 50 to rise such that the free end 504 of the locating hook 50 can block the upper positioning pin 62 but cannot block the lower positioning pin 61, because the lower positioning pin 61 can pass under the locating hook 50. Furthermore, the elongate slot 41 of the regulating plate 40 does not push the rod 32 at this time, so that the push rods 31, which are connected to the rod 32 via the plate 33, will not shut the opaque movable blades 121 so that the exposure window 12 is fully open. While the film advance wheel 60 rotates one cycle on each winging, the striking plate 70 will be pushed to the preparing position for shutter striking. The film advance wheel 60 will rotate one cycle as the shutter is struck once, and the film advance wheel 60 will wind the film to the length required for whole frame photography.

If it is desired to change the camera to perform half frame photography, the operating member 45 is moved to the left side to push the regulating plate 40 along the positioning plate 14 until the positioning projection 42 engages with the left notch 141 of the positioning plate 14. In this position, the viewfinder eyepiece cover 46 will be located over the viewfinder 24. Since the width of the viewfinder cover 46 is one half of the width of the viewfinder 24, an object viewed through the viewfinder 24 is reduced to one half of the whole frame use. The inclined ends 44 will leave from the reciprocating plate 501 so said plate 501 will get down under the weight of itself and the action of the springs 503, whereby the free end 504 of the locating hook 50 is moved to a position effective to block both the upper positioning pin 62 and the lower positioning pin 61. At the same time, the elongate slot 41 will push the rod 32 to move the plate 33 towards along the path 301 and a direction which is perpendicular to the pulling direction of the film 10.

The push rods 31 are thus effective to push the associated opaque movable blades 121 to shield the sides of the exposure window 12, so that the width of the exposure window 12 is reduced to one half of the original width of the whole frame use. Since the locating hook 50 can block both the upper positioning pin 62 and the lower positioning pin 61, when film advance wheel 60 rotates half a cycle the shutter striking plate 70 will get ready for the shutter strike position but cannot continue winding the film 10. Therefore, the length of the film 10 to be wound is only half of the length for whole frame use. As described previously, the width of the partly shielded viewfinder 24 is reduced to one half of the width for whole frame use and the same is true for the exposure window 12. Thus, the camera has become a half frame camera completely and can photograph twice as many pictures as the camera used as a whole frame camera does.

The present invention therefore provides a camera mean which can make a camera be used for whole frame photographing or half frame photographing functions as well. Whenever the half frame camera is desired, use the operating member 45 outside the camera body 20 to push the inside regulating plate 40, then to make the viewfinder eyepices cover 46 superpose the viewfinder 24, and also make the opaque movable blades 121 move to cover the sides of the exposure window 12 located between the lens 21 and the film 10 so that the width of the exposure window 12 is reduced to one half of the original width. At the same time, the locating hook 50 is moved down to a position effective to block the upper positioning pin 61 such that the film advance wheel 60 only can wind one half length of the whole frame film as the striking plate 70 gets prepare for shutter striking. Thus, the viewfinder 24, the exposure window 12, and the wound film length are reduced to one half of the whole frame camera use at the same time to serve half frame photography.

A second example of a camera means according to this invention is illustrated in FIGS. 7 to 11 of the drawings in which both sides of the upper and lower walls of an exposure chamber 11 has a pair of bores 110 to hold pivot pins for pivotally movable opaque blades 121. Moreover, the upper wall of the exposure chamber 11 carries a guide pin 111, a regulating plate 40, and an operating member 45, extending to the outside of the camera body. The plate 40 and operating member 45 are formed integrally and the plate 40 is provided at each side with a lateral slot 401 and a rod 402. Each rod 402 is connected to one end of tension spring 124, while the other end of spring 124 is connected to eccentric pin 123 of opaque blade 121. Furthermore, a projection 403 is provided at the far right hand side of the regulating plate 40 and at the left hand side of the plate 40 an elongate slot 404 is provided to receive the guide pin 111 so as to guide the regulating plate 40 in moving back and forth when the latter is mounted on the exposure chamber 11. A slider 405 is formed at the far left hand side of narrow the regulating plate 40, and a neck 406 symmetrically formed is to connect said slider 405 and said plate 40.

A plate 47 is located over the regulating plate 40, while the centre of the plate 47 having an opening 471 whose side has a support plate 473 to support the slide wall 451 at the lower end of the operating member 45. The plate 47 further has two raised projections 472 engageable with respective slots 701 of striking plate 70. Therefore, when the striking plate 70 is mounted on the plate 47, it can slide horizontally with respect to the plate 47 within the limits imposed by the engagement of the projections 472 in the slot 701. The left side of the far end of the plate 47 has a pair of lugs 474, each lug having a bore 475 for pivotally receiving a corresponding view shielding stick 48. The lower end 482 of each view shielding stick 48 is pulled by spring 483 towards the other view shielding stick to clasp the neck 406 of the regulating plate 40. The upper end of each view shielding stick 48 has an indicating pointer 481, or other appropriate equivalent indicating device, and as shown in FIG. 9, the pointers are usually located at each sides of the viewfinder 24. Inside the viewfinder 24, there are a wider whole frame area boundary line 241 for photograph viewing and a half frame area boundary line 242, inside the whole frame bounday line, whose width is one half of the whole frame area. If the regulating plate 40 is moved towards the rear of the camera, the lower ends 482 of the view shielding sticks 48 will clasp the wide portion of two sides of the slider 405, such that the two indicating pointers 481 will be swing pivotally towards each other and enter the position between the half frame boundary line 242 and the whole frame boundary line 241 to let the user understand that the camera is set for half frame photography and that only the view inside the half frame boundary line 242 can be photographed.

Figure 10:
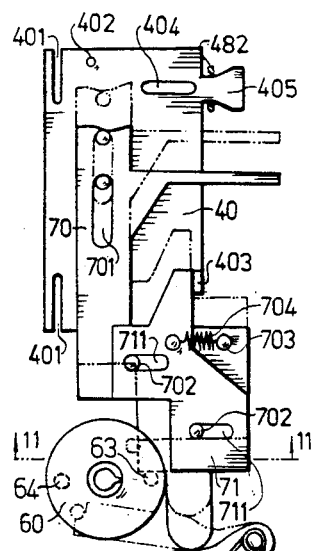
FIG. 10 is a top partial view of the second example to illustrate the operating relationship between the regulating plate and the film advance wheel.
Figure 11:
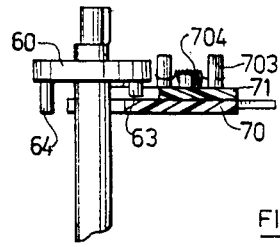
FIG. 11 is a section taken along the line 11—11 of FIG. 10.

The right side of the striking plate 70 has two guide rods 702 and a spring rod 703, and a clutch plate 71 of two parallel elongate slots 711 is located over the plate 70 with the guide rods 702 extending through the slots 711 in the clutch plate 71. A spring 704 is mounted on the spring rod 703 and on a similar rod mounted on the clutch plate 71 to urge the clutch plate to the position shown in FIG. 7 of the drawings in which an inclined side edge of the clutch plate 71 is held against the spring rod 703. The clutch plate 71 is movable on plate 70 by the projection 403 on the regulating plate 40 and the spring 704 on rod 703 will bring clutch plate 71 to its original position. The lower edge of the film advance wheel 60 has a long rod 64 and a short rod 63 spaced apart by 180 degrees at the same radial distance from the axis of the wheel 60, yet the 63 and 64 rods can be designed as cams or other equivalent components which possess the effective motion with specific cyclic property. When the clutch plate 71, as shwon in FIGS. 10 and 11, is pushed to the left by the projection 403 on the regulating plate 40, its direction towards the position for half frame photography, and the long rod 64 and the short rod 63 of the film advance wheel 60 can push the striking plate 70 to move then the positioning arm 50 moves to the blocking position after the striking plate 70 moves away. After taking a picture, the striking plate 70 comes back to the original position and the positioning arm 50 is therefore pushed away so that the film advance wheel 60 can rotate. Thus, the film advance wheel 60 can only rotate by one half cycle after each photograph. However, if the regulating plate 40 is moved by the operating member 45 back to the original position, only the long rod 64 can push the striking plate 70 to move, therefore, the film advance wheel 60 can rotate by one cycle after each photograph.

According to the above description, as the regulating plate 40 is moved towards the rear of the camera on the axial line parallel to the lens 21, the pointers 481 of the view shielding sticks 48, designed for view shielding, can shield the sides of the viewfinder 24 and the opaque movable blades 121 also shield the sides of the exposure window 12 so that the exposure window 12 has only a half width. At the same time, the clutch plate 71 is moved to the position at which the short rod 63 can push, and the positioning arm 50 can swing toward the left to enter the position for blocking the long rod 64 and the short rod 63 only after the striking plate 70 has shifted to the left. Therefore, the film advance wheel 60 can rotate only one half cycle after each photograph so that each film length to be wound is half of the film length to be wound for whole frame photography.

Figure 12:
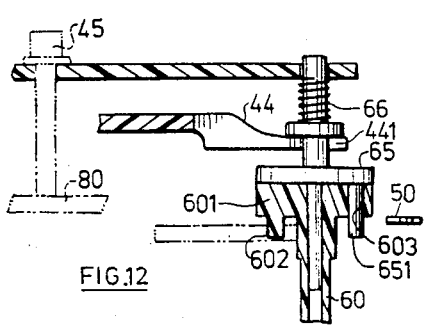
FIG. 12 is a section of a third example to show how the regulating plate controls the film advance wheel.
Figure 13:
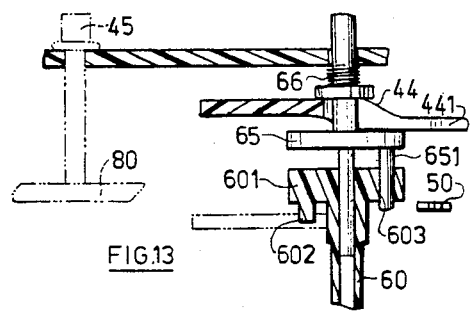
FIG. 13 is a front view corresponding to FIG. 12 but showing another operation.

A third example of a camera mean according to the invention is to employ a regulating plate 40 to control the rotating angle of the film advance wheel 60 as shown in FIGS. 12 and 13 of the drawings.

In this example, there is a flange 601 above the film advance wheel 60, and a main drive rod 602 is installed below the flange 601. A bore 603 is provided in the flange 601 at the opposite side spaced from the rod 602 by 180 degrees. The upper end of the film advance wheel 60 passes through an elongate slot 441 of the inclined plates 44 on the regulating plate 40. An auxiliary drive wheel 65 is mounted on the film advance wheel 60 and carries an axuiliary drive rod 651 which engages with the bore 603 of the film advance wheel 60 and extends from the flange 601 by substantially the same length as the main drive rod 602. The upper portion of the auxiliary drive wheel 65 is always acted on by a coil spring 66. When the regulating plate 40 is moved to the right as viewed in FIGS. 12 and 13, the auxiliary drive wheel 65 is raised by the inclined faces of the plates 44 so that only the main drive rod 602 can push the striking plate 70 to move to the left at this moment (there is no clutch plate 71 overlapped on the striking plate 70 in this example); while the positioning arm 50 driven by the striking plate 70 can only block the auxiliary drive rod 651 each time so that the film advance wheel 60 can rotate one cycle for each photograph. However, if the regulating plate 40 is moved to the left, the auxiliary drive rod 651 descends with the auxiliary drive wheel 65 to the position where it can push the striking plate 70, and because said plate 70 is moved to the left, the positioning arm 50 can block both the main drive rod 62 and the auxiliary drive rod 651. Therefore, the film advance wheel 60 can only rotate through one half cycle after each photograph. In this case, the regulating plate 40, similar to that of the first example of this invention, has a elongate slot 41. When the plate 40 moved horizontally, it can drive the push rods 31 of the first example or the regulating plate 40 of the second example to move back and forth by the aid of the rod 32 to control the opaque movable blade 121 to swing to cover part of the shield exposure window. In this case, the indicating device of the viewfinder 24 can apply either the shiedling method of the first example or the pointer method of the second example.

Figure 15:
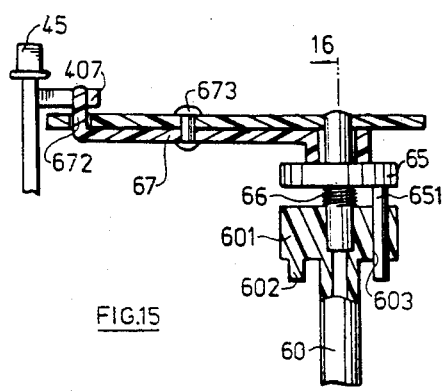
FIG. 15 is a front view showing a fourth example illustrating how the regulating plate controls the film advance wheel.
Figure 16:
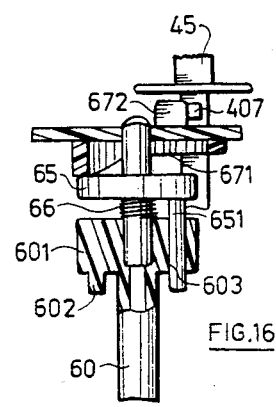
FIG. 16 is a side partial view of FIG. 15.

In the fourth example of a camera mean according to the invention shown in FIGS. 15 and 16, the regulating plate 40 is similar to that of the second example, the striking plate 70 is the same as the third example, and the film advance wheel 60 and the auxiliary drive wheel 65 are similar to those of the third example, but the spring 66 is installed between the auxiliary drive wheel 65 and film advance wheel 60 and the clutch plate 71 is deleted. The upper portion of the auxiliary drive wheel 65 is disposed with a pivoting lever 67, and a sloping face 671 is below the right side of the lever 67. The lever 67 has a bore substantially at its centre to receive of a pivot pin 673 and the other end of the lever 67 has a rod 672. A push lever 407 projecting from the regulating plate 40 moves with the regulating plate 40 to the near end to push the rod 672 and to make the lever 67 pivot, so that the sloping face 671 will push down the auxiliary drive wheel 65 as well as the auxiliary drive rod 651, and also against the action of the spring 66, the auxiliary drive rod 651 is moved to the position to push the striking plate 70. The film advance wheel 60 can then only rotate one half cycle for each photograph to achieve the purpose that the film length to be wound is one half of the original length; the working procedure is similar to that in the third example.

A fifth example of a camera mean according to the invention is shown in FIGS. 17 to 19 of the drawings. The regulating plate 40 of this example is similar to that of the second example, but the side below the operating member 45 is connected to a plate 451 which has a sloping face and two different elevated faces. The right side of the striking plate 70 has a pair of lugs 705 which pivotally hold a lever 706 strained upwardly to touch the plate 451. Above the film advance wheel 60, a cam 68 is mounted and has two cam lobes and one of them having an opening 681. The characteristics of the cam 68 are demonstrated clearly in FIGS. 18 and 19.

When the operating member 45 is moved to the near end, the plate 451 will press the lever 706 down to the position along the line 19—19 of FIG. 17 such that both lobes of the cam 68 can push the lever 706 to make the striking plate 70 move to the left and make the positioning arm 50 enter the blocking position to hold against the rod 682 below the cam 68. Therefore, the film advance wheel 60 can rotate only one half cycle for each photograph. However, if the operating member 45 is moved to the far end, the lever 706 is moved upwardly due to the spring force to the elevation of the opening 681 in the cam 68, so that the lever 706 can block only the cam lobe without an opening and the positioning arm 50 can only block one of the rod. Therefore, the film advance wheel 60 rotates one complete cycle for each photograph.

All the examples described above use the film advance wheel 60 to push the striking plate 70 to the preparing position for shutter striking. However, in the sixth example shown in FIG. 20 of the drawings, the drive structure of the film advance wheel 60, either a rod or a cam, can be revised as pull brake plate 81. As shown in FIG. 20, there is a main drive cam 604 on the film advance wheel 60, whose function is equivalent to that of the main drive rod in the previous example. An auxiliary drive cam 691 is connected with an elevating ring 692, and can be pushed by the slopping face of the regulating plate 40 to lift or descend freely on the film advance wheel 60 Said cam 691 functions as the auxiliary drive rod in previous example.

A brake plate 81, having a raised portion 811 at one end, is located within the action radius of the drive cam 604. An elongate slot 812 is provided at the centre of the brake plate 81 and pivotally holds a pin 82, so that the brake plate 81 can rotate and swing back or forth within a fixed path. The other end of the brake plate 81 is forked into a blocking foot 813 and a support foot 814 which is always strained by the force of a spring 83 and disposed close to the side of press plate 85 which has an opening 852. The press plate 85 is so arranged that, when it is pressed, its lower end can push the shutter shield plate to act so that the film is exposed. Also the bulging portion 851 will to push the brake plate 81 to swing and make the raised portion 811 leave away from can 604 or 691. Then the film advance wheel can rotate counterclockwise due to external force. At this moment, the brake plate 81 is pulled by the spring 83 to draw back and to swing slightly toward the right to let the blocking foot 813 enter the opening 852 of the press plate 85. The press plate 85 cannot then be pressed further until one of the cams 604 and 691 can touch the raised portion 811 of the brake plate 81 and pull it forward to make the blocking foot 813 move away from the opening 852 of the press plate 85. Since the cams 604 and 691 are spaced apart from each other by 180 degrees, photographing can work as the film advance wheel is controlled by the regulating plate 40 to rotate one complete cycle or one half cycle.

In all the examples described above, when the striking plate 70 is pushed each time to the preparing position for shutter striking and the film advance wheel 60 rotates through a full cycle or a half cycle, the clutch devices for the interaction between the striking plate 70 and the film advance wheel 60, formed as rod, cam, or other equivalent devices, all possess the same function motion with a specific cyclic property; they are regarded to be the characteristics of this invention.

Based on all the examples, it can be understood that the regulating plate 40 of this invention actuates the view shield device to shield the portion of the view area from the sides of the viewfinder, drive the opaque movable blades to swing to shield the exposure window from the sides, and actuate a clutch device to control the rotation range of the film advance wheel such that those devices of this invention enable a camera to be shifted quickly for whole frame or half frame photographing.

I claim:
1. A camera which can regulate the exposure area of a frame of film comprising:
  (a) a body;
  (b) a film advance wheel for turning the film take-up spool around and for returning a shutter striking plate to its original position;
  (c) a regulating plate;
  (d) a view shield device arranged to be actuated by the regulating plate and movable between a first position in which it is substantially clear of the viewfinder and a second position in which it is effective to shield the viewfinder to reduce the viewing area to approximately half the total width thereof;
  (e) means for guiding movement of the regulating plate;
  (f) at least two opaque movable blades arranged to be driven by the regulating plate to shield an exposure window of the camera from the sides of the window such that the width of the exposure window is reduced to approximately one half of the total width;
  (g) a clutch device actuable by the regulating plate to control the film advance wheel to rotate through one cycle or one half on each operation of the shutter mechanism of the camera;
  (h) an operating member accessible from outside the camera, said operating member being arranged to move the regulating member between two positions and the regulating member being arranged, when being moved from a first to a second position, to move the view shield device to the second position, to move the opaque movable blades to shield half of the width of the exposure window and to move control means for the film advance wheel so that said wheel can rotate through only one half cycle after each shutter operation such that the length of the film advanced is reduced to one half of the normal length advanced; when being moved from the second position back to the first position, to move the view shield device to the first position, to move the opaque movable blades to a position in which they no longer obstruct the exposure window and to move said control means for the film advance wheel so that said wheel can rotate through one full cycle after each shutter operation so that the length of film advanced corresponds to a full frame of the exposure window.

2. A camera according to claim 1, wherein said view shield device comprises a viewfinder eyepiece cover whose width is one half of the width of the viewfinder and which is movable with the regulating plate to overlap the viewfinder when the said regulating plate is moved to its second position.

3. A camera according to claim 1, wherein said view shield device comprises a pair of indicating pointers which are actuable by the regulating plate and can be moved from the sides of the viewfinder to cover the side areas of the viewfinder when the regulating plate is moved to its second position.

4. A camera according to claim 1, wherein said view shield device comprises an indicating device which is actuable by the regulating plate and is pivotally movable to cover the side areas of the viewfinder when the regulating plate is moved to its second position.

5. A camera according to claim 1, wherein said clutch device comprising at least one inclined plate on the regulating plate and said inclined plate is engageable with means for regulating the elevation of a locating hook and wherein the film advance wheel is provided with two projections of different height, the locating hook being effective to block either only one of the projections in the first position of the regulating plate to permit one complete revolution of the film advance wheel, or to block both of the projections in the second position of the regulating plate to permit only half a revolution of said film advance wheel.

6. A camera according to any one of claims 1 to 4, wherein said clutch device comprises two overlapping clutch plates mounted on a shutter striking plate and wherein the film advance wheel is provided with two projections of different height, said clutch plates being movable by the regulating plate so that in one position only one of the projections is blocked by the clutch plates so as to permit one complete revolution of the film advance wheel and in the other position both of the projections are blocked by the clutch plates so as to permit only half a revolution of the said film advance wheel.

7. A camera according to claim 6, wherein the projections on the film advance wheel comprise pins of different height spaced apart by 180 degrees from each other and located at substantially the same radical distance from the axis of the wheel.

8. A camera according to any one of claims 1 to 4, wherein said clutch device comprises an auxiliary drive wheel which is engageable with the film advance wheel and which is coaxially arranged with respect thereto, the regulating plate having an inclined face which is engageable with the auxiliary drive wheel to raise or lower said wheel and the auxiliary drive wheel having a projection which in the lower position of said wheel is engageable with blocking means to restrict rotation of the film advance wheel.

9. A camera according to claim 8, wherein the projection on the auxiliary drive wheel comprises an auxiliary drive rod which extends through a bore in the film advance wheel and wherein the film advance wheel is provided with a main drive rod spaced from the auxiliary drive rod by 180°, the rods being located at substantially the same radial distance from the axis of said film advance wheel.

10. A camera according to claim 8, wherein the projection on the auxiliary drive wheel comprises a drive cam.

11. A camera according to any one of claims 1 to 4, wherein said clutch device comprises a cam having two cam lobes mounted on the film advance wheel, one cam lobe being engageable with a projection in both positions of the regulating plate and the other cam lobe being engageable with a projection in only the second position of the regulating plate.

12. A camera according to claim 11, wherein the regulating plate is provided with an inclined face which is engageable with a lever and which is effective, when the regulating plate is moved to its second position, to move said lever into a position in which it is engageable with both of said cam lobes.

13. A camera according to any one of claims 1 to 4, wherein said clutch device comprises a brake plate engageable by a drive cam mounted on the film advance wheel, one end of the brake plate being engageable by the drive cam and the other end being engageable in an opening in a press plate, the brake plate being movable, in response to movement of the regulating plate, between a frist position in which it permits one complete revolution of the film advance wheel for full frame photography and a second position in which it permits only one half revolution of the film advance wheel for half frame photography.

* * * * *